United States Patent
Okamoto et al.

(10) Patent No.: US 6,717,105 B1
(45) Date of Patent: Apr. 6, 2004

(54) LASER ANNEALING OPTICAL SYSTEM AND LASER ANNEALING APPARATUS USING THE SAME

(75) Inventors: Tatsuki Okamoto, Tokyo (JP); Tetsuya Ogawa, Tokyo (JP); Yukio Sato, Tokyo (JP); Junichi Nishimae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/305,168

(22) Filed: Nov. 27, 2002

(51) Int. Cl.[7] .............................................. B23K 26/00
(52) U.S. Cl. ................................................ 219/121.76
(58) Field of Search ........................ 219/121.6, 121.68, 219/121.69, 121.73, 121.74, 121.75, 121.76, 121.85

(56) References Cited

U.S. PATENT DOCUMENTS

| | | | |
|---|---|---|---|
| 5,529,951 A | | 6/1996 | Noguchi et al. |
| 5,893,990 A | | 4/1999 | Tanaka |
| 6,060,684 A | * | 5/2000 | Moriike |
| 6,239,406 B1 | * | 5/2001 | Onoma et al. |
| 6,326,219 B2 | | 12/2001 | Markle et al. |
| 6,437,284 B1 | | 8/2002 | Okamoto et al. |

FOREIGN PATENT DOCUMENTS

| EP | 1 256 977 | 11/2002 |
|---|---|---|
| WO | WO 02/31871 | 4/2002 |

OTHER PUBLICATIONS

U.S. patent application Ser. No. 09/708,608, filed Mar. 8, 2000.

* cited by examiner

Primary Examiner—Samuel M. Heinrich
(74) Attorney, Agent, or Firm—Leydig, Voit & Mayer, Ltd.

(57) ABSTRACT

A laser optical system includes a linear beam forming member for forming laser beams radiated from laser oscillators into a linear beam shape on a silicon film on a substrate. The laser optical system is arranged so that the optical axes of laser beams from the laser oscillators to the linear beam forming member are in substantially the same plane and substantially perpendicular to the substrate. Each laser beam is reflected from a reflecting mirror and applied to the silicon film on the substrate. Since the laser beams are applied to the substrate at the same time, the area irradiated can be increased, while each radiating laser beam maintains a required radiation intensity, resulting in high productivity.

11 Claims, 7 Drawing Sheets

LASER ANNEALING OPTICAL SYSTEM AND LASER ANNEALING APPARATUS USING THE SAME

BACKGROUND OF THE INVENTION

1. Field of the Invention

The present invention relates to a laser heat treatment apparatus and its optical system for forming a polycrystalline semiconductor film having excellent crystallinity to realize a thin film transistor with high mobility.

2. Related Art

A pixel portion of a liquid crystal panel makes up an image by switching the thin film transistors made from an amorphous or polycrystalline silicon film formed on a substrate of glass or composite quartz. Conventionally, a driver circuit for driving these pixel transistors is disposed separately, but it is expected that the driver circuit will be constructed in proximity to the pixel transistor at the same time the pixel transistors are formed. If this is possible, there is a remarkable merit in terms of the manufacturing cost and reliability of the liquid crystal panel.

However, due to low crystallinity of the silicon film constituting an active layer of transistors, the thin film transistors are low in performance, typically in mobility. Therefore, it was difficult to fabricate an integrated circuit requiring high speed and high functionality.

Thus, to realize the thin film transistor with high mobility, a method for improving the crystallinity of silicon film involves a laser heat treatment of radiating a laser to the silicon film formed on the substrate to enhance the crystallinity.

The relationship between the crystallinity of silicon film and the mobility of thin film transistor is described below. The silicon film produced through the laser heat treatment is typically polycrystalline. A grain boundary of polycrystal is constituted of lattice defects, which scatter the carriers in the active layer of the thin film transistor to impede the movement. Accordingly, to enhance the mobility of the thin film transistor, it is important to reduce the number of carriers traversing the grain boundary in moving through the active layer. Therefore, it is required to decrease the density of lattice defects. The laser heat treatment is aimed at forming the polycrystalline silicon film having large crystal grain diameter and with less lattice defects on the grain boundary.

The present inventors proposed an optical system for laser heat treatment in the Japanese Patent Application No. Hei 11-179233, in which a laser beam a laser oscillator is distributed linearly on the surface of silicon film through the optical system, and the linear beam is swept relatively on the silicon film in its orthogonal direction.

FIGS. 7A to 7D are typical views of the optical system. A laser beam 2 radiated from the laser oscillator 1 is passed through intensity distribution forming member 30 and beam shape forming member 31 to illuminate the silicon film on the substrate.

The laser beam 2 radiated from the laser oscillator 1 typically shows a Gauss intensity distribution. The intensity distribution forming member 30 preserves the Gauss intensity distribution in the x direction of beam section, and smoothes the intensity distribution only in the y direction of beam section. The laser beam with such a top hat distribution is adjusted in the magnification of laser beam length in the x and y directions by the beam shape forming member 31, and the beam shape is made rectangular on the amorphous or polycrystalline silicon film 5. If the longitudinal direction of rectangular laser beam is taken as the y direction, the intensity distribution XC in the x direction on the upper face C of the silicon film has a reduced shape of the intensity distribution XA in the x direction on a plane of incidence A for the intensity distribution shaping member 30, still preserving a property of directivity of the oscillating laser beam 2, while the intensity distribution YC in the y direction is substantially uniform on the upper face C of silicon film.

On the other hand, the silicon film as the subject of laser radiation is formed on a silicon oxide film as an under-layer film 6 on the substrate 7 made of glass, which is fixed on a scanning stage, and heated by radiation of the laser beam while the radiated laser beam of rectangular shape is being moved in the x direction.

If the laser beam of rectangular shape is radiated onto the surface of the silicon film 5 formed on the substrate while sweeping it in the x direction, the silicon film 5 is heated by absorbing the laser beam, and melted in a rectangular shape. At this time, there is no temperature gradient in the longitudinal direction or the y direction of radiating laser beam, because the intensity distribution of laser beam 2 is uniform, but there is some temperature gradient caused by cooling in the sweep direction or x direction. When the melted silicon film is crystallized by the cooling, the crystal grows in accordance with the temperature gradient, causing one dimensional growth (one directional growth) in the movement direction on the x direction of the substrate 7, so that the crystal grains having a grain diameter of about several $\mu$m are formed along the sweeping direction.

If the rectangular beam is employed for the laser heat treatment, the intensity distribution in the width direction of laser beam has a great effect on a recrystallizing growth process, and the intensity distribution in the longitudinal direction governs the area where the crystal grows, whereby an appropriate beam profile and the intensity of radiation must be chosen to fabricate the thin film transistor having excellent characteristics. However, the optical system for forming the rectangular beam has a limited laser output, and to obtain a required intensity of radiation, it is necessary to shorten the length of radiating laser beam in the longitudinal direction, resulting in lower productivity.

SUMMARY OF THE INVENTION

The present invention is achieved in the light of the above-mentioned problems, and it is an object of the invention to provide a laser annealing apparatus that can form a silicon thin film having a smaller density of lattice defect and a high crystallinity through the laser heat process, with a high productivity of the silicon thin film.

The present invention provides a laser optical system for laser annealing comprising a plurality of linear beam forming member for forming the laser beams radiated from a plurality of laser oscillators into linearly radiating laser beams on the surface of an amorphous or polycrystalline semiconductor film formed on a substrate, wherein the laser optical system has each laser oscillator and linear beam forming member corresponding thereto, which are arranged so that an optical axis of laser beam may be substantially parallel to the substrate and in a transverse direction, and has a reflecting mirror for reflecting each laser beam to be applied substantially vertically on the surface of the semiconductor film on the substrate.

In this invention, the reflecting mirror may be a single reflector common to the optical axes of a plurality of laser beams. Thereby, the number of optical parts can be reduced and the optical system simplified.

Also, the linear beam forming member may comprise a cylindrical lens converging in a direction orthogonal to the optical axes of laser beams, in which the cylindrical lens may be a single cylindrical lens common to the plurality of laser beams. Thereby, the laser optical system can be simplified.

Particularly, the laser optical system of this invention may have such a structure that the optical axes of laser beams are arrayed in a longitudinal direction to the surface of the substrate. Thereby, the plurality of laser oscillators, the plurality of linear beam forming member and the plurality of reflecting mirrors are arranged to be piled up in the longitudinal direction.

The laser optical system of this invention can array the linearly radiating laser beams on the surface of the semiconductor film on the substrate to be a substantially straight line in the longitudinal direction of beams. In another form, the laser optical system of the invention can array the radiating laser beams in proximity on the surface of the semiconductor film on the substrate without overlapping each other. With these arrangements, the plural radiating laser beams synthesized on the semiconductor film have an even intensity distribution, thereby widening an area of laser beam radiation to crystallize the wider area through one scanning pass.

The invention is applicable to a silicon film formed on the substrate as the semiconductor film, whereby the polycrystalline silicon substrate can be used for the thin film transistor having excellent crystallinity.

The laser oscillator is preferably a pulse laser oscillator having an oscillation wavelength from 330 to 800 nm, and particularly uses the harmonics of a solid state laser. Laser beams in this range of wavelength are especially effective for uniformly heating the amorphous silicon film in the thickness direction.

Moreover, the invention provides a laser annealing apparatus comprising the laser optical system combined with a stage for laying the substrate formed with the semiconductor film, wherein a relative movement between a linear laser beam and the stage is made by moving the laser beam in its width direction on the surface of the silicon film to melt and crystallize the silicon film. Preferably, the stage is provided with a scanning drive device to enable the stage to be scanned.

Figure 1:
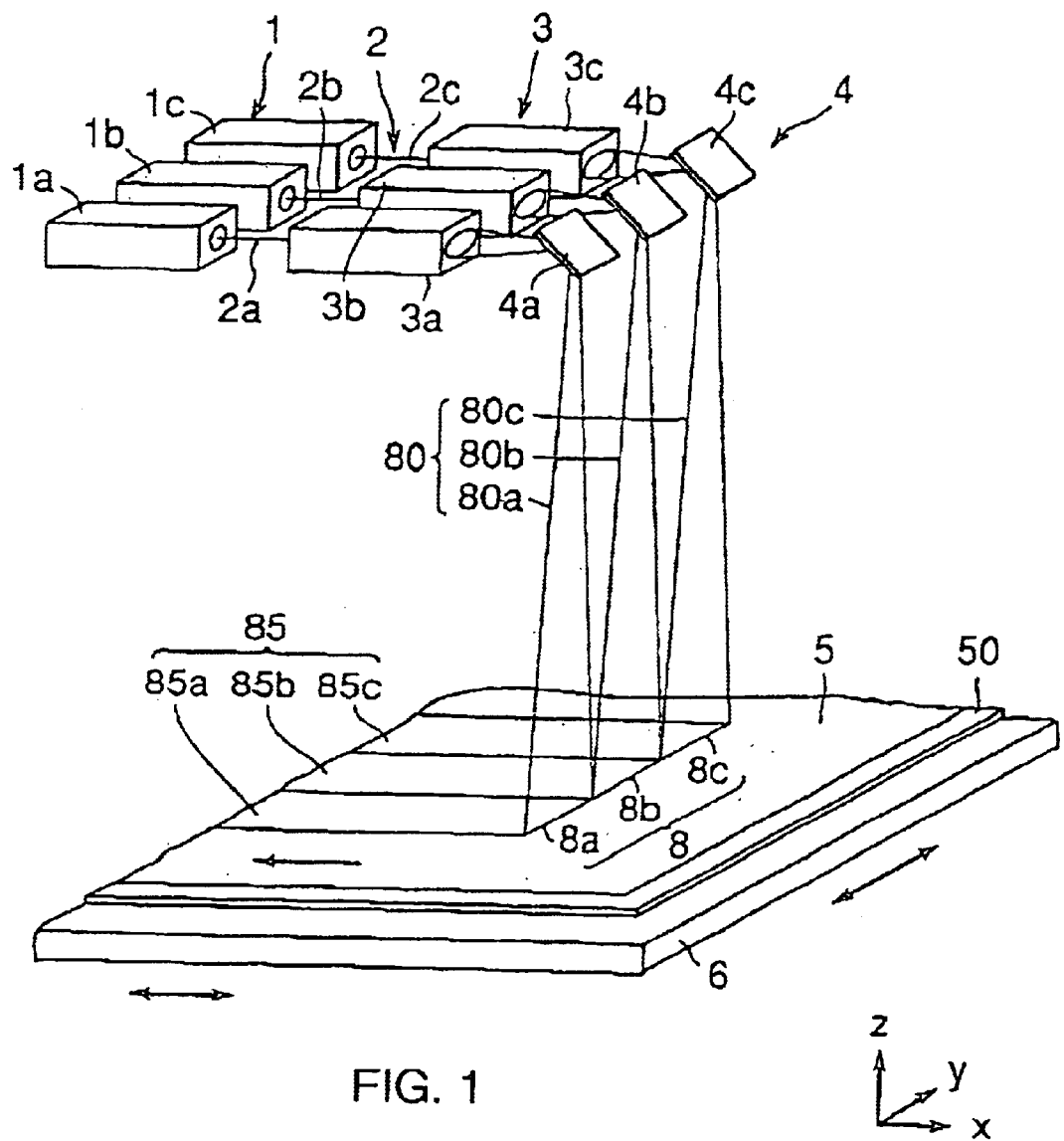
FIG. 1 is a typical perspective view showing the arrangement of a laser annealing apparatus according to an embodiment of the present invention.

DETAILED DESCRIPTION OF THE PREFERRED EMBODIMENT (Embodiment 1)

A laser optical system of this invention roughly comprises linear beam forming member for converting each of the laser beams from a plurality of laser oscillators into a linear beam shape, and a reflecting mirror for reflecting each beam from the linear beam forming member onto the surface of a semiconductor film such as a silicon film on a substrate, in which the linear beam forming member forms each beam to have a linear distribution in section as directed to the silicon film on the substrate.

This linearly radiating laser beam is moved on the surface of the silicon film in a direction of narrower width of the linear beam during the treatment, and in this movement, a portion of the silicon film is heated by applying the linear beam and then cooled by passing the linear beam. At the time of heating, the silicon film is melted, and crystallized by cooling immediately after heating. In this manner, a crystal zone is formed on the silicon film through one scanning pass of the linearly radiating laser beam. The crystal zone has a width corresponding to the synthesized length of plural linear beams that scan, and has large crystal grains which are grown in one direction, because the linear beam makes an even distribution of beam intensity in the longitudinal direction of beam.

The optical system of this invention employing the linear beam forming member to cope with the plurality of laser oscillators, can form, through one scanning pass of plural radiating laser beams, the crystal zones by the number of laser beams in parallel, and in a wide range. In particular, in this invention, the laser oscillators are arranged in the movement direction of laser beams on the surface of the silicon film, without providing any gap between plural linear beams and overlapping linear beams, so that heating and cooling evenly occur in the longitudinal direction of the linear beam, thereby forming large crystal grains that are grown in one direction over the wide range. Through each scanning pass, the plurality of crystal zones are repeatedly scanned to crystalline the area over the wide range efficiently.

As seen from FIGS. 1 to 4, in this invention, the laser oscillators 1 (1a to 1c), the linear beam forming member 3 (3a to 3c), and the reflecting mirrors 4 (4a to 4c) are arranged, so that the beam optical axes 2 (2a to 2c) may be horizontal. The reflecting mirrors 4 (4a to 4c) are disposed above a substrate 50 on a stage 6.

Laser beams 2a to 2c are radiated from the plurality of laser oscillators 1a to 1c toward the linear beam forming member 3a to 3c, respectively. A beam profile is adjusted through each of the linear beam forming member 3a to 3c, and each beam from the linear beam forming member 3a to 3c is reflected from reflecting mirror 4a to 4c, and vertically applied on the silicon film. In this example, each of the linear beam forming member forms the laser beam to become a linear beam that is reflected from each of the reflecting mirrors 4a to 4c and applied on the surface of the silicon film on the substrate.

Figure 8A:
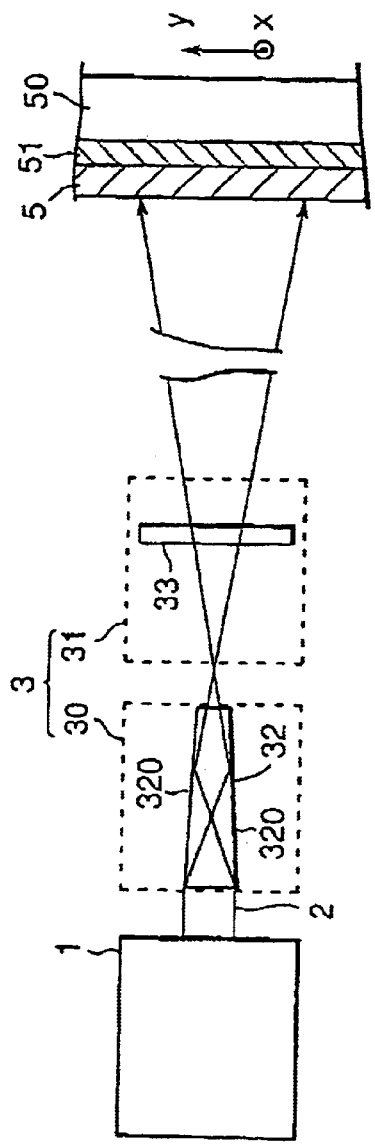
FIGS. 8A and 8B are views showing the detailed constitution of the laser optical system.
Figure 8B:
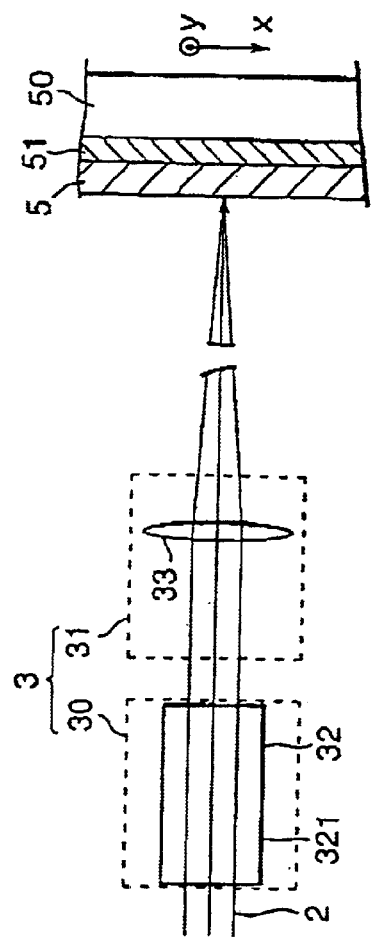

The linear beam on the surface of the silicon film is controlled to have a laser intensity distribution that is even in the longitudinal direction over a certain length, and narrow in width and sharp in the width direction. This laser optical system can employ an optical system for laser heat treatment as disclosed in the Japanese Patent Applications No. Hei11-179233. FIGS. 8A and 8B show the linear beam forming member 3 for use with the laser optical system of the invention. This linear beam forming member 3 is composed of intensity distribution forming member 30 and beam shape forming member 31, and employs an oblate waveguide 32 for the intensity distribution forming member 30, and a cylindrical lens 33 for the beam shape forming member 31. The waveguide 32 has a pair of reflecting surfaces 320, 320 opposed in the y direction in a taper manner so that light can be led between the reflecting surfaces. The laser beam 2 from the laser oscillator 1 passes through the waveguide 32 of the intensity distribution forming member 30 in such a manner that light components around the laser beam 2 are being reflected against the reflecting surfaces 320, 320 in the y direction, but transmitted in the x direction without being reflected into the beam shape forming member 31. Or the incident side of the beam shape forming member 31, the laser beam has a profile that is broader in the y direction, and narrow in the x direction.

The cylindrical lens 33 of the other beam shape forming member 31 is a convex lens converging in the x direction alone, whereby the beam narrowed in width in the x direction is further converged as shown in FIGS. 8A and 8B. In this example, the beam is projected onto the silicon film 5 to form a linear beam that is substantially focused in the x direction and has appropriate broadening in the y direction. Though the reflecting mirror is omitted in FIGS. 8A and 8B, the beam shape forming member 31 is arranged horizontally, and the reflecting mirror 4 is interposed behind the beam shape forming member 31, so that the beam reflected from the reflecting mirror 4 is directed as a vertical linear beam onto the horizontal silicon film 5.

On the other hand, the silicon film 5 subjected to laser treatment is formed on the substrate in a size and a shape corresponding to its uses. The substrate 50 is preferably made of glass or ceramics especially for polycrystalline silicon for a liquid crystal display, whereby an insulating layer, for example, a silicon oxide film, is formed as the under-layer film 51 on the substrate. The silicon oxide film 51 can be formed by CVD (Chemical Vapor Deposition). The thickness is in a range from 100 to 300 nm, and particularly about 200 nm.

The amorphous silicon film 5 to be treated is formed on the silicon oxide film 51 as the under-layer on the substrate 50 by LPCVD (Low Pressure Chemical Vapor Deposition) corresponding to its uses, in which the thickness is in a range from 30 to 150 nm, and particularly about 50 nm. The silicon film may be crystalline, or amorphous silicon film crystalline substance with crystal grains precipitated by preliminary annealing. The substrate 50 formed with such silicon film is laid and secured on the stage 6.

The silicon film is radiated by linearly radiating laser beam while being moved relatively in the width direction or x direction. The relative movement of the radiating laser beam is made in such a manner that the stage is moved relative to the fixed optical system in the x direction or two orthogonal directions containing the x direction. The movement involves scanning by making variable the radiation angle of laser beam particularly by rotating the reflecting mirror of the optical system.

If the laser beam is radiated onto the silicon film during the relative movement, the silicon film is heated by absorbing the laser beam, and melted like rectangle corresponding to a shape of laser beam. The melted silicon film has a temperature gradient only in the movement direction of x direction, and has no temperature gradient in the longitudinal direction or y direction of the radiating laser beam, because the melted silicon film has an even intensity distribution of the laser beam 2. The melted silicon film is crystallized and grown along the temperature gradient as one dimensional growth (unidirectional growth) in the movement direction of the x direction of the substrate 7, so that crystal grains with crystal grain diameters of as large as several $\mu$m are formed.

The process of crystal growth by radiation is greatly affected by the temperature distribution formed in the x direction within the amorphous or polycrystalline silicon film, that is, the intensity distribution of rectangular laser beam in the width direction. Heat introduced into the amorphous or polycrystalline silicon film by laser beam radiation is uniformly dissipated into the substrate. That is, the temperature distribution in the x direction within the amorphous or polycrystalline silicon film is uniformly reduced. Accordingly, the melted silicon film is crystallized and growth from a portion where the temperature passes a melting point ahead toward a portion where the temperature decreases below the melting point later. And the growing crystal is blocked in its growth by the growth of crystalline due to occurrence of natural nuclei while the temperature is decreasing, so that crystal growth in the x direction is ceased. That is, it is required that crystal grains are grown as long as possible by the time when the natural nucleis occurs. For this purpose, the high crystal growth rate is required.

Generally, the crystal growth rate v in a certain minute area is dependent on a ratio of the temperature difference $\Delta T$ in the minute area to the width $\Delta x$ of the minute area, namely temperature gradient, and represented as $v = k \Delta T / \Delta x$, where k is a rate constant.

When there is some temperature distribution in the x direction within the silicon film, the crystal growth rate can be increased if the temperature gradient is sharp in the area having the temperature of melting point or above, so that the polycrystalline silicon film having large crystal grain diameter can be form, making it possible to form the thin film having excellent crystallinity required to fabricate the thin film transistor with high performance.

In the apparatus of this embodiment, plural laser beams 2a to 2c radiated from the plurality of laser oscillators 1a to 1c are converted linearly in the same manner, and radiated as linear beams onto the substrate 50 formed with the silicon film to form plural crystal zones, whereby a required radiation area can be increased while a required radiation intensity of each beam is maintained, resulting in higher productivity.

For the laser oscillator of this invention, the laser beam has preferably an oscillation wavelength, especially in a range from 330 to 880 nm. The oscillated light with wavelength in the range from 330 nm to 800 nm has a relatively small absorption coefficient for the amorphous silicon, and the laser beam is penetrated in a direction of film thickness, so that the substance is heated substantially evenly in the direction of film thickness, whereby the temperature distribution in the transverse direction within the silicon film to be displayed by laser radiation is formed only in the x direction. Accordingly, a radiated region having a certain intensity distribution of radiating laser beam or greater in the amorphous or polycrystalline silicon film that is a film material on the substrate is melted over a direction of depth.

Using such a wavelength area, the amorphous or polycrystalline silicon film can be heated evenly in the thickness direction, whereby in a laser heat treatment method, the thin film having excellent crystallinity required to fabricate the thin film transistor of high performance can be produced.

For the laser beam having an oscillation wavelength from 330 to 800 nm, a harmonics generating source for a solid-state later, for example, can be employed. For example, a second harmonic (532 nm) or a third harmonic (355 nm) for the Nd:YAG laser, a second harmonic (524 nm) or a third harmonic (349 nm) for the Nd:YLF laser, and a second harmonic (515 nm) or a third harmonic (344 nm) for the Yb:YAG laser may be used. A fundamental harmonic or second harmonic of the sapphire laser may be also employed.

The solid-state laser as the harmonics generating source can be used to generate a laser beam having an oscillation wavelength in a range from 340 to 800 nm efficiently, employing a compact apparatus to enable the stable operation over the long time.

In this embodiment, the laser optical system as described above employs three combinations of linear beam forming member 3a to 3c and reflecting 4a to 4c. As shown in FIG. 1, the optical axes of the laser beams 2a to 2c from the laser oscillators 1a to 1c to pass through the linear beam forming member 3a to 3c are arranged in a plane substantially parallel to the surface of the substrate. And the laser beams radiated from the linear beam forming member are reflected from the reflecting mirrors 4a to 4c and applied as linearly radiating laser beam substantially vertically on the surface of the silicon film 5 on the substrate 50. The arrangement of radiating laser beams is such that linearly radiating laser beams are arrayed on the surface of the silicon film 5 in straight line in the longitudinal direction and proximately to each other, making it possible to secure a wide radiation area through one scanning pass of the radiating laser beam.

In this example, the laser oscillators 1a to 1c use the Nd:YAG laser, the linear beam forming member 3a to 3c use a combination of the waveguide 31 and the convex cylindrical lens 33 with the opposed reflecting surfaces, and the reflecting mirrors 4a to 4c use a plane mirror for the linear beam forming member 3a to 3c.

The laser annealing apparatus using this laser optical system comprises a scanning mechanism (not shown) that can scan in the x-y direction over the stage 6 on which the laser optical system is fixed and the substrate 50 is securely laid as shown in FIG. 1. The radiating laser beams 8a to 8c of the above array are scanned on the surface of the silicon film 5 by moving the stage 6 in the x direction, thereby crystallizing the molten silicon by melting the silicon film 5 and solidifying it in the cooling process in a radiation area 85 as wide as three radiating laser beams 8a to 8c to produce a crystal zone with a large grain boundary. After the first pass, the stage is shifted in the y direction by the width of three radiating laser beams 8a to 8c, and shifted back in the x direction. Thereby, after the second pass, a crystal zone adjacent to the crystal zone of the previous first pass can be produced. Through such scanning, a desired area 85 can be made the crystal zone having coarse crystal grains.

Figure 2:
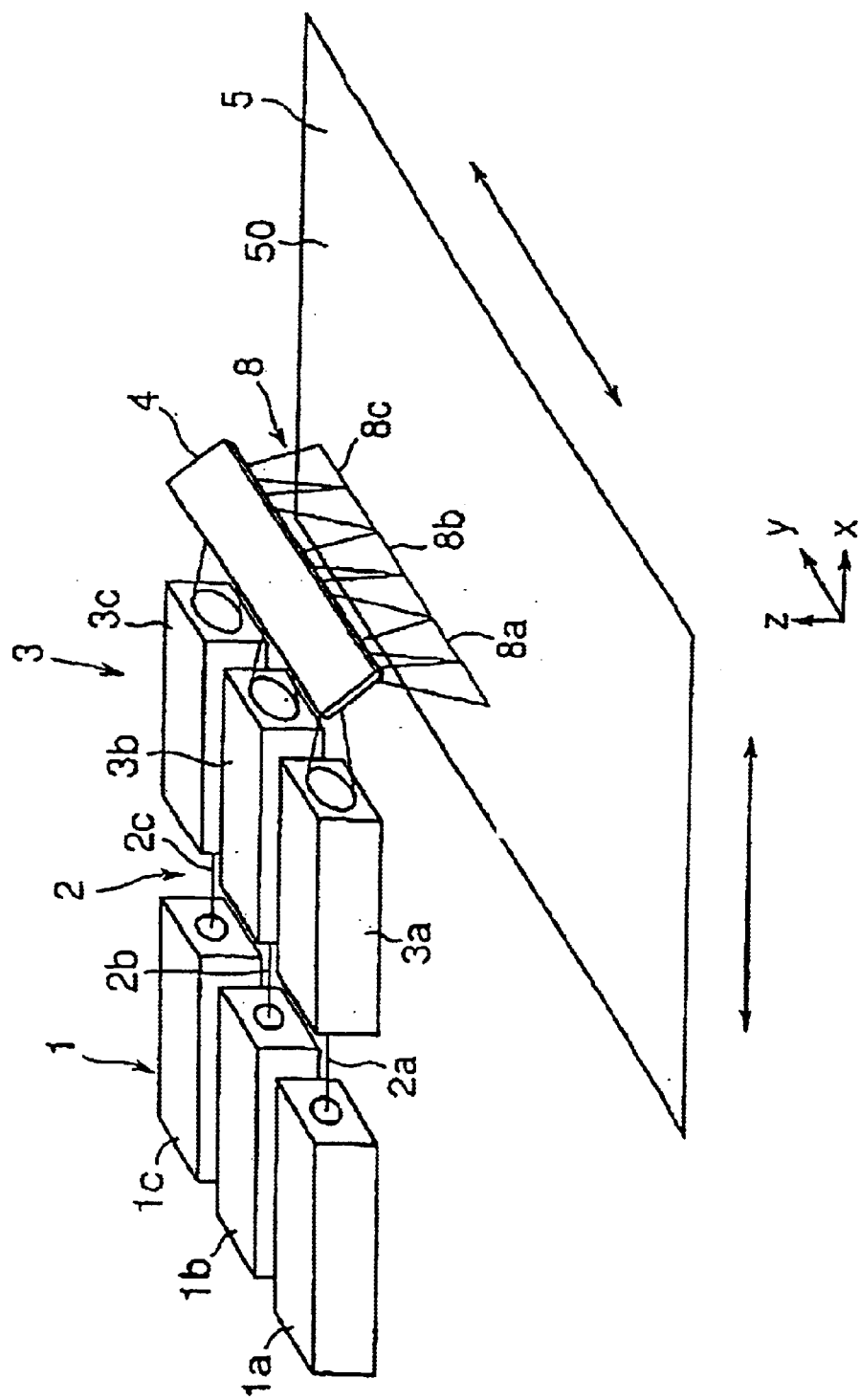
FIG. 2 is a typical perspective view showing the similar arrangement of the laser annealing apparatus according to the embodiment of the invention.
Figure 3:
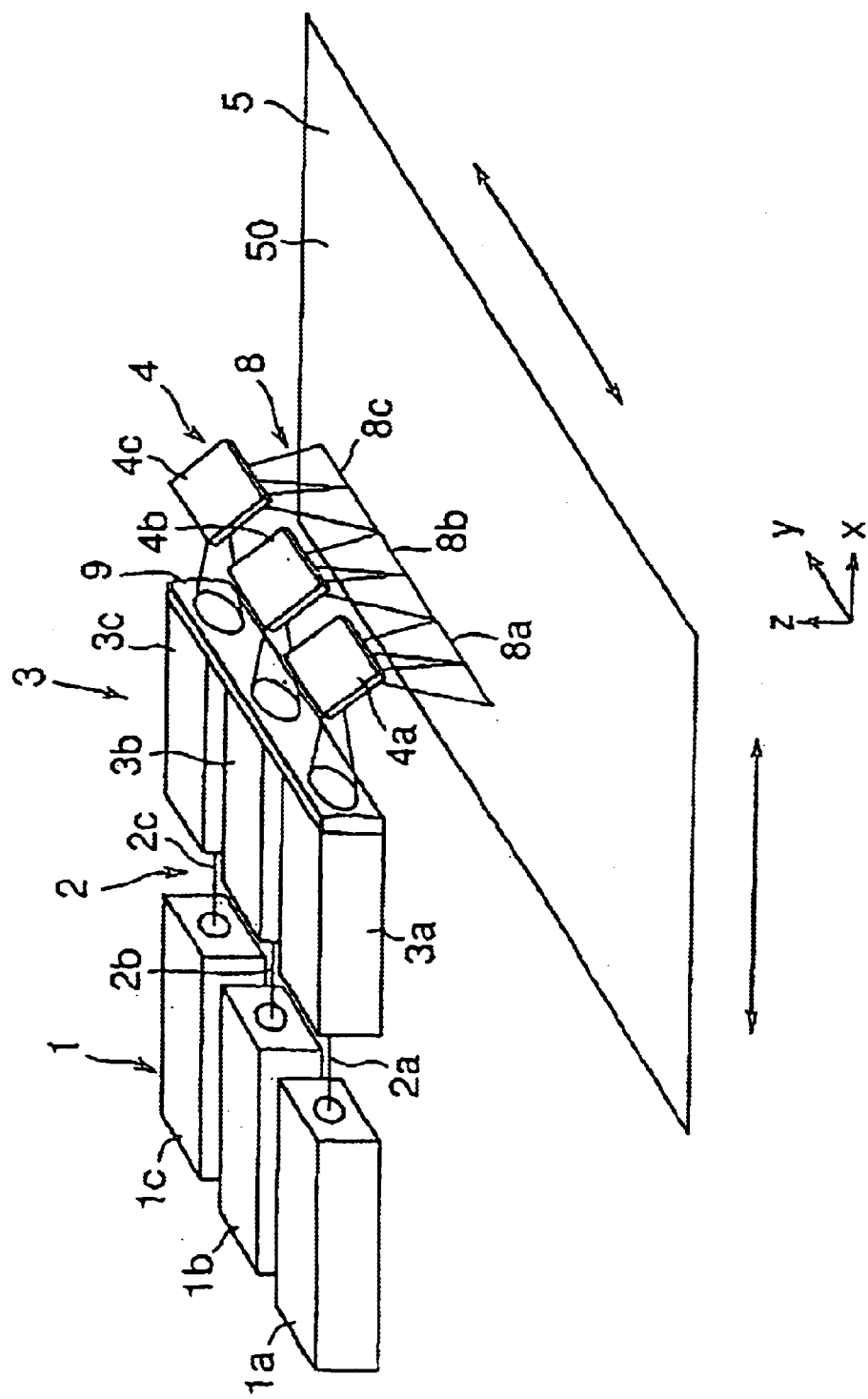
FIG. 3 is a typical perspective view showing the arrangement of a laser annealing apparatus according to another embodiment of the invention.

In this embodiment, the reflecting mirrors 4a to 4c are arranged separately corresponding to linear beam forming member 3a to 3c. However, in a variation example, if the beams of the linear beam forming member 3a to 3c are reflected onto the surface of the substrate 50, one reflecting mirror may be employed. In FIG. 2, a single reflecting mirror 4 is employed for three linear beam forming member 3a to 3c. Other parts of the optical system are the same as in this embodiment. By the use of the single reflecting mirror, the apparatus can be simplified, and reduced in size and cost, thereby preventing interference of the optical system.

Further, the linear beam forming member 3 employs the cylindrical lens 33 individually as the beam shape forming member 31 to converge the radiating laser beam in the x direction. However, in a variation example of FIG. 3, the single cylindrical lens 9 is employed for the linear beam forming member 3a to 3c to transforms the radiating laser beams into a linear beam. The cylindrical lens 9 has the same function as the cylindrical lens 33 of FIGS. 8A and 8B, but one cylindrical lens 9 is shared among three sets of beam shape forming member 31, thereby reducing the number of parts, size and cost for the laser optical system, and preventing interference of the optical system.

Further, as a variation of the above embodiment, the cylindrical lens 9 may be arranged behind the reflecting mirrors 4a, 4b and 4c on the optical axis, namely, under the reflecting mirrors 4a, 4b and 4c. Further, one sort of the cylindrical lens may be shared, so long as the cylindrical lens acts in a direction perpendicular to the plane composed of the optical axes of laser beams.

(Embodiment 2)

Figure 4:
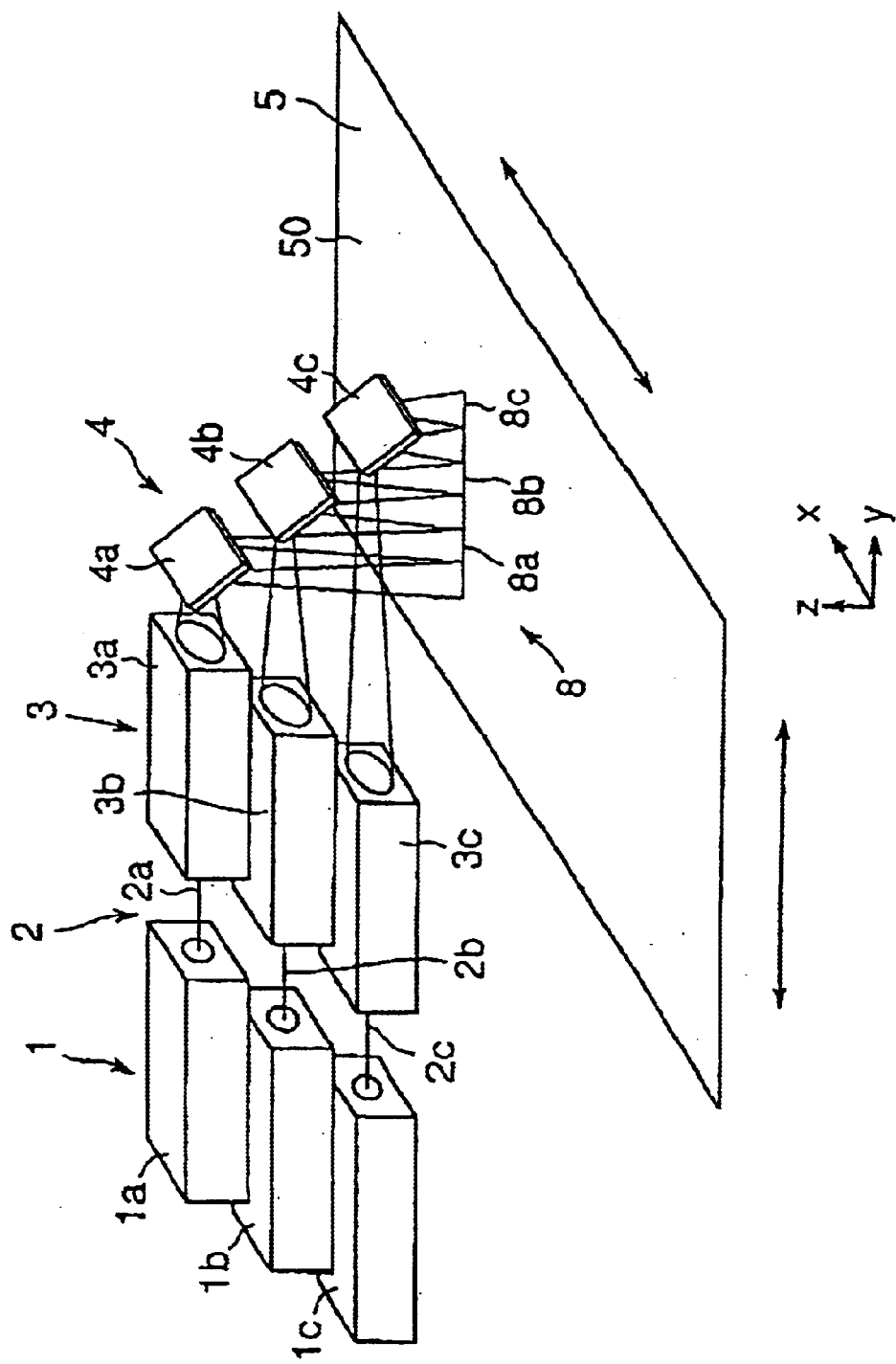
FIG. 4 is a typical perspective view showing the arrangement of the laser annealing apparatus using a laser optical system according to another embodiment of the invention.

The laser optical system of this invention may have the laser optical axis passing through each laser oscillator and linear beam forming member arranged within the plane parallel to the substrate and substantially perpendicular to the substrate. In this embodiment as shown in FIG. 4, the optical axis of the laser oscillator and the linear beam forming member corresponding thereto is parallel to the substrate 50, and three combinations of laser oscillators 1a to 1c and the linear beam forming member 3a to 3c are arranged one on the other above the substrate 50. The reflecting mirrors 4a to 4c corresponding to three sets of linear beam forming member are inclined to reflect the radiating laser beams 8a to 8c from the linear beam forming member 3a to 3c substantially vertically onto the substrate.

In this example, the radiating laser beams on the surface of the silicon film on the substrate 50 are arrayed such that the longitudinal direction of three linearly radiating laser beams 8a to 8c passing through three linear beam forming member 3a to 3c onto the substrate 50 is parallel to the laser optical axes passing through the laser oscillators and the linear beam forming member.

The laser annealing apparatus with this optical system can produce the wider crystal zone corresponding to the sum of the widths of three radiating laser beams 8a to 8c by scanning over the narrow width direction (x direction) of three linearly radiating laser beams 8a to 8c in the same manner as in the embodiment 1.

(Embodiment 3)

Figure 5:
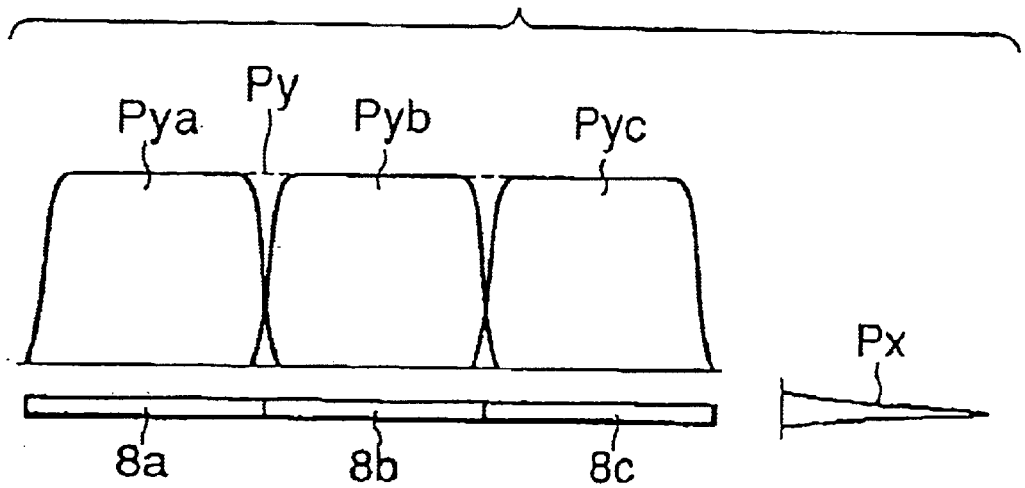
FIG. 5 is a chart showing the intensity distribution of radiating laser beams synthesized on a silicon film by the laser optical system according to the embodiment of the invention.

In the laser optical system of this invention, a plurality of radiating laser beams 8a to 8c applied on the substrate 50 have a linear profile on the substrate, and are arranged linearly in series in its longitudinal direction or the y direction. FIG. 5 shows the intensity distributions Pya to Pyc in the x direction and y direction of the radiating laser beams 8a to 8c applied on the silicon film 5 through the linear beam forming member 3a to 3c from three laser oscillators 1a to 1c.

Since the linear beam forming member 3a to 3c are difficult to produce the intensity distribution in the y direction that is sharp and fully rectangular in the peripheral portion, the intensity distribution of the radiating laser beams 8a to 8c in the y direction is gentle in the peripheral portion. Thus, the peripheral portion for the intensity distribution of linearly radiating laser beam 8b in the y direction appropriately overlaps the peripheral portions of the radiating laser beams 8a and 8c from the other laser oscillators, as shown in FIG. 5. Thereby, the intensity distribution Py in which the radiating laser beams 8a to 8c radiated from the laser oscillators are synthesized in the y direction can be substantially uniform on the surface of the silicon film on the substrate 50, as shown in FIG. 5. Thereby, on the scanned surface of the silicon film, the crystal zone as wide as the length of the synthesized intensity distribution can be formed through one scanning pass. In this manner, the radiating light intensity that is substantially uniform in the y direction is obtained, whereby the even polycrystalline silicon film can be formed and the thin film having excellent crystallinity required to fabricate the thin film transistor of high performance can be formed.

Figure 6:
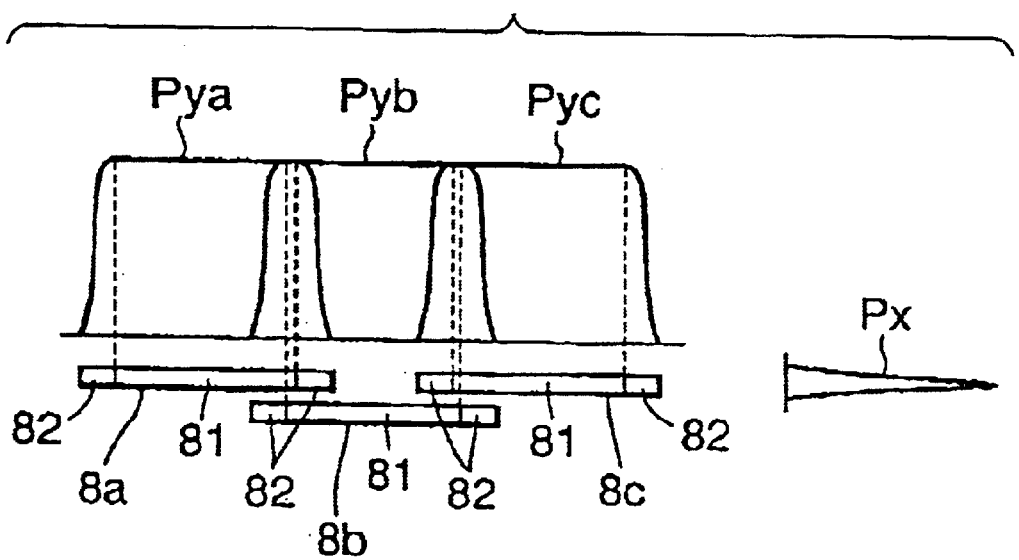
FIG. 6 is a chart showing the intensity distribution of radiating laser beams synthesized on the silicon film by the laser optical system according to the embodiment of the invention.
Figures 7A, 7B, 7C, 7D:
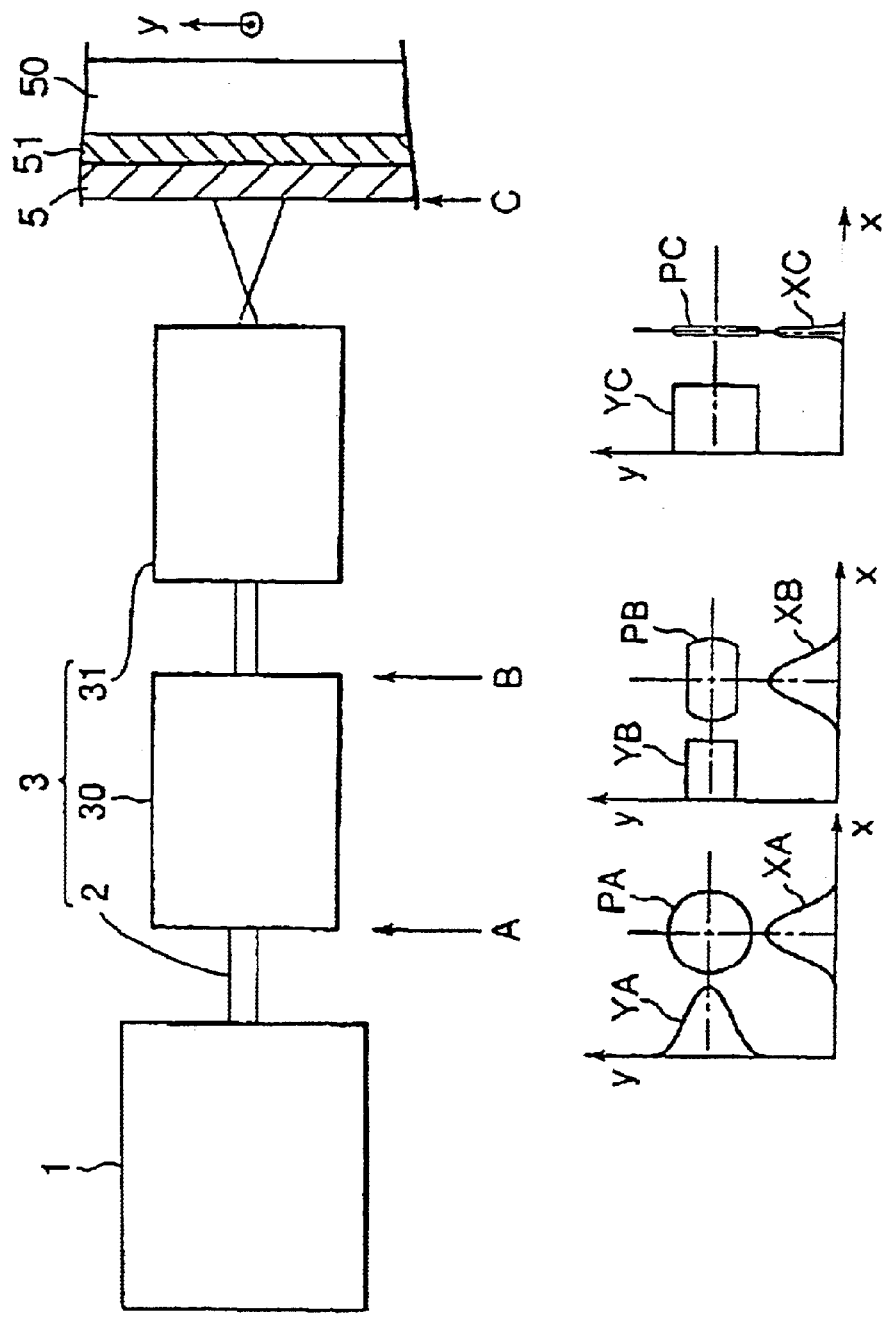
FIGS. 7A to 7D are views showing a single laser optical system constituting the basis of the laser annealing apparatus.

FIG. 6 shows another variation of the arrangement of the radiating laser beams 8a to 8c. In this example, the radiating laser beams 8a, 8b and 8c are arrayed in proximity without overlapping on the substrate 50, but the adjacent radiating laser beams 8a, 8b and 8c are arrayed such that the regions 81 having even intensity distribution of radiating laser beams in the y direction overlap each other in the y direction on the silicon film. Such arrangement of the radiating laser beams 8a, 8b and 8c is implemented by deviating the laser beams 2a, 2b and 2c in the x direction from the parallelism by a slight angle. Alternately, it may be adjusted by slightly shifting the angle of the adjacent reflecting mirrors 4a to 4c in the x direction.

In this arrangement of radiating laser beams, there is no portion of locally high illumination intensity, thereby preventing the amorphous of polycrystalline silicon film from being damaged or the produced crystal grains from becoming crystallite due to uneven temperature distribution.

With the present invention, the laser optical system comprises a plurality of laser oscillators, and linear beam forming member corresponding thereto and reflecting mirrors, in which the optical axes of laser beams from the laser oscillators to the linear beam forming member are on the substantially same plane parallel to the substrate, and each laser beam is reflected by the reflecting mirror to be applied on the amorphous or polycrystalline semiconductor film formed on the substrate. Thereby, the radiation area can be increased in width as the composite length of laser beams, while each radiating laser beam keeps a required radiation intensity, the polycrystalline semiconductor film having a smaller density of lattice defects and large crystal grains can be mass produced, resulting in higher productivity, optical system for laser radiation optically stable can be obtained.

With the invention, the reflecting mirror may be a single reflector common to a plurality of laser beams. Thus, the number of optical parts can be reduced and the optical system has a small size and the lower cost, whereby there is the effect that the interference of the optical system can be prevented.

If a single cylindrical lens is employed commonly for the plurality of linear beam forming member, the number of optical parts can be reduced, and the optical system has a smaller size and the lower cost, whereby there is the effect that the interference of the optical system can be prevented.

With this invention, if the lesser optical system has the optical axes of the laser beams from the laser oscillator to the linear beam forming member arrayed in a substantially vertical direction to the surface of the substrate, the laser oscillator and the linear beam forming member are arranged to be piled up with a spacing from each other in the vertical direction, but not in the horizontal direction, whereby the optical system can be easily constructed by preventing the interference between optical parts.

If linearly radiating laser beams are arrayed to be a substantially straight line in its longitudinal direction by the plurality of intensity distribution forming member, synthesized radiating laser beam has a even radiation intensity in its longitudinal direction, whereby a uniform polycrystalline semiconductor film can be formed, thereby producing the thin film having excellent crystalline required to fabricate the thin film transistor with high performance.

If the optical system is arranged so that the radiating laser beams formed by the plurality of intensity distribution forming member are not overlapped, there is no portion of locally high radiation intensity because the radiating laser beam does not overlap the other radiating laser beams, whereby it is possible to prevent the semiconductor film from being damaged by high laser intensity.

With this invention, the laser optical system is applied to the silicon film as the semiconductor film, the polycrystalline silicon film with a small density of lattice defects and large crystal grains can be mass-produced, resulting in higher productivity. Hence, the silicon substrate for forming the thin film transistor for liquid crystal display is fabricated.

If the laser beam from the laser oscillator has an oscillation wavelength from 320 to 800 nm, the silicon film can be heated uniformly in the thickness direction, whereby it is possible to produce the thin film having excellent crystallinity required to fabricate the thin film transistor with high performance.

Since the laser oscillator can use the harmonics of the solid-state laser, the laser oscillator can be made compact, and the silicon film can be heated uniformly in the thickness direction.

With this invention, the laser annealing apparatus comprises the laser optical system, and the stage for laying and fixing the substrate, the relative movement between the radiating laser beam and the silicon film on the substrate is made so that the coarse crystal grains are obtained on the silicon film at high productivity.

In particular, if the stage has the scanning function to scan the stage, the laser optical system can be fixed, thereby allowing the correct positioning and movement of the radiating laser beam to be made, and the crystallization process at high precision to be easily effected.

What is claimed is:

1. A laser optical system comprising:

a plurality of laser oscillators for producing respective laser beams, a plurality of linear beam forming members for forming corresponding laser beams radiated from respective laser oscillators into radiating laser beams linearly incident on a substantially planar surface of a substrate, said plurality of laser oscillators and corresponding linear beam forming members being arranged so that optical axes of the laser beams are substantially parallel and the laser beams are arranged side-by-side in a linear array on the surface, adjacent laser beams being contiguous on the surface, and a reflecting mirror for reflecting each laser beam so that each laser beam is substantially perpendicular to the surface.

2. The laser optical system according to claim 1, wherein said reflecting mirror is a single reflector common to the optical axes of the plurality of laser beams.

3. The laser optical system according to claim 1, wherein said plurality of linear beam forming members comprises a cylindrical lens converging the laser beams in a direction orthogonal to the optical axes of the laser beams, said cylindrical lens being a single cylindrical lens common to the plurality of laser beams.

4. The laser optical system according to claim 1, wherein said plurality of laser oscillators are pulsed laser oscillators producing light at a wavelength from 330 to 800 nm.

5. The laser optical system according to claim 4, wherein said plurality of laser oscillators provides harmonics of light produced by a solid state laser.

6. A laser annealing apparatus comprising:

a plurality of laser oscillators for producing respective laser beams, a plurality of linear beam forming members for forming corresponding laser beams radiated from respective laser oscillators into radiating laser beams linearly incident on a substantially planar surface of a substrate, said plurality of laser oscillators and corresponding linear beam forming members being arranged so that optical axes of the laser beams are substantially parallel and the laser beams are arranged side-by-side in a linear array on the surface, adjacent laser beams being contiguous on the surface, a reflecting mirror for reflecting each laser beams so that each laser beam is substantially perpendicular to the surface, and a stage for supporting and moving the substrate relative to the plurality of laser beams.

7. The laser annealing apparatus according to claim 6, further comprising a drive device for scanning said stage.

8. The laser optical system for radiating a plurality of laser beams onto a surface of a work piece, the laser optical system comprising:

a plurality of laser oscillators for producing respective laser beams; and a plurality of linear beams forming members for forming laser beams radiated by the laser oscillators into a linear shape free of gaps on the surface of the work piece, wherein the laser beams are moved in a direction substantially perpendicular to the linear shape of the laser beams and perpendicular to propagation directions of the laser beams.

9. The laser optical system according to claim 8, wherein each of said laser oscillators and corresponding linear beam forming members are arranged in a direction perpendicular to the surface of the work piece so that optical axes of the laser beams are parallel to the work piece.

10. The laser optical system according to claim 8, wherein the beams on the surface of the work piece lie on a substantially straight line in a longitudinal direction of the laser beams.

11. The laser optical system according to claim 8, wherein the laser beams are arrayed on the work piece without overlapping of adjacent laser beams.

* * * * *